United States Patent
Parry-Jones et al.

(10) Patent No.: US 9,255,521 B2
(45) Date of Patent: Feb. 9, 2016

(54) GAS TURBINE ENGINE INSTALLATION INCLUDING A FLEXIBLE PRINTED CIRCUIT BOARD HARNESS FOR TRANSFERRING ELECTRICAL SIGNALS AROUND THE GAS TURBINE ENGINE INSTALLATION

(71) Applicant: ROLLS-ROYCE PLC, London (GB)

(72) Inventors: Ian Mark Parry-Jones, Market Drayton (GB); Jaspal Singh Johal, Derby (GB)

(73) Assignee: ROLLS-ROYCE plc, London (GB)

( * ) Notice: Subject to any disclaimer, the term of this patent is extended or adjusted under 35 U.S.C. 154(b) by 594 days.

(21) Appl. No.: 13/659,367

(22) Filed: Oct. 24, 2012

(65) Prior Publication Data

US 2013/0111924 A1    May 9, 2013

(30) Foreign Application Priority Data

Nov. 4, 2011 (GB) ................... 1119040.2

(51) Int. Cl.
*F02C 7/00* (2006.01)
*B60R 16/02* (2006.01)
*H01B 7/00* (2006.01)
(Continued)

(52) U.S. Cl.
CPC .............. *F02C 7/00* (2013.01); *B60R 16/0215* (2013.01); *H01B 7/00* (2013.01); *H01B 7/04* (2013.01); *H01B 7/041* (2013.01); *H01B 7/043* (2013.01); *H01B 7/045* (2013.01); *H01B 7/046* (2013.01); *H01B 7/065* (2013.01); *H01B 7/08* (2013.01); *H02G 3/26* (2013.01); *H02G 3/32* (2013.01); *H02G 7/053* (2013.01);
(Continued)

(58) Field of Classification Search
CPC ...... H01B 7/00; H01B 7/0018; H01B 7/0054; H01B 7/04; H01B 7/041–7/046; H01B 7/08; H01B 7/0807–7/0892; H01B 7/102; H01B 7/282; H01B 7/17; H01B 7/29; H01B 7/295; H01B 7/0045; B60R 16/0215; B60R 16/0207; H05K 1/0393; H02G 3/32; H02G 3/065; H02G 7/053; H02G 3/26
See application file for complete search history.

(56) References Cited

U.S. PATENT DOCUMENTS 5,264,814 A * 11/1993 Yamazaki et al. .............. 336/65
6,033,745 A *  3/2000 Yamaguchi et al. ............ 428/31
(Continued)

FOREIGN PATENT DOCUMENTS

EP    1 491 806 A1   12/2004
FR    2 906 336 A1    3/2008
(Continued)

OTHER PUBLICATIONS

Feb. 27, 2012 Search Report issued in British Application No. GB1119040.2.

*Primary Examiner* — William H Rodriguez
*Assistant Examiner* — William Breazeal
(74) *Attorney, Agent, or Firm* — Oliff PLC

(57) ABSTRACT

A gas turbine engine installation is provided that has a plurality of flexible printed circuit board (FPCB) harnesses to transfer electrical signals, including electrical power, around a gas turbine engine. The plurality of FPCB harnesses is held to the gas turbine engine installation using generally U-shaped clips that have a base from which first and second sidewalls extend. The FPCB harness is held between the tips of base-teeth extending from the base, and side-teeth extending from the first and second sidewalls. In this way, the FPCB harness can be held securely in position by the clip.

14 Claims, 6 Drawing Sheets

(51) Int. Cl.
*H01B 7/04* (2006.01)
*H01B 7/08* (2006.01)
*H02G 3/32* (2006.01)
*H02G 3/06* (2006.01)
*H02G 7/05* (2006.01)
*H02G 3/00* (2006.01)
*H01B 7/06* (2006.01)

(52) U.S. Cl.
CPC ........ *F05D 2250/75* (2013.01); *F05D 2260/30* (2013.01); *Y02T 50/672* (2013.01)

(56) References Cited

U.S. PATENT DOCUMENTS

| | | | |
|---|---|---|---|
| 6,299,469 | B1 | 10/2001 | Glovatsky et al. |
| 8,038,104 | B1 * | 10/2011 | Larkin ........................ 248/55 |
| 2008/0134477 | A1 | 6/2008 | Hart et al. |

FOREIGN PATENT DOCUMENTS

| | | | | |
|---|---|---|---|---|
| GB | 2463867 | A * | 3/2010 | ............ H01R 12/14 |
| JP | A-2007-116783 | | 5/2007 | |
| JP | A-2007-159272 | | 6/2007 | |

* cited by examiner

GAS TURBINE ENGINE INSTALLATION INCLUDING A FLEXIBLE PRINTED CIRCUIT BOARD HARNESS FOR TRANSFERRING ELECTRICAL SIGNALS AROUND THE GAS TURBINE ENGINE INSTALLATION

CROSS-REFERENCE TO RELATED APPLICATIONS

This application is based upon and claims the benefit of priority from British Patent Application Number 1119040.2 filed 4 Nov. 2011, the entire contents of which are incorporated by reference.

BACKGROUND OF THE INVENTION

1. Field of the Invention

This invention relates to a network for distributing signals and power around a gas turbine engine using a flexible harness. In particular, this invention relates to clips for holding a flexible harness for a gas turbine engine.

2. Description of the Related Art

A typical gas turbine engine has a substantial number of electrical components which serve, for example, to sense operating parameters of the engine and/or to control actuators which operate devices in the engine. Such devices may, for example, control fuel flow, variable vanes and air bleed valves. The actuators may themselves be electrically powered, although some may be pneumatically or hydraulically powered, but controlled by electrical signals.

Electrical power, and signals to and from the individual electrical components, are commonly transmitted along conductors. Conventionally, such conductors may be in the form of wires and cables which are assembled together in a harness. In such a conventional harness, each wire may be surrounded by an insulating sleeve, which may be braided or have a braided cover. The connections between the individual components and the conventional harness are made, for example, by multi-pin plug and socket connectors. Similarly, communication between the harness and power, control and signalling circuitry is achieved through a multi-pin connector.

By way of example, FIG. 1 of the accompanying drawings shows a typical gas turbine engine including two conventional wiring harnesses 102, 104, each provided with a respective connector component 106, 108 for connection to circuitry accommodated within the airframe of an aircraft in which the engine is installed.

The harnesses 102, 104 are assembled from individual wires and cables which are held together over at least part of their lengths by suitable sleeving and/or braiding. Individual wires and cables, for example those indicated at 110, emerge from the sleeving or braiding to terminate at plug or socket connector components 112 for cooperation with complementary socket or plug connector components 114 on, or connected to, the respective electrical components.

Each conventional harness 102, 104 therefore comprises a multitude of insulated wires and cables. This makes the conventional harness bulky, heavy and difficult to manipulate. It is desirable to reduce the size and weight of components on gas turbine engines, particularly, for example, gas turbine engines for use on vehicles, such as aircraft.

It is proposed to replace at least a portion of, for example all of, the conventional harness with a flexible printed circuit board harness (FPCB harness). An example of a portion of such a flexible printed circuit board harness 20 is shown in FIGS. 2 to 5. FIG. 2 shows a perspective view of the FPCB harness portion, and FIGS. 3, 4, and 5 show side, top, and cross-sectional views respectively.

Such an FPCB harness 20 may comprise a flexible (for example elastically deformable) substrate 40 with conductive tracks 30 laid/formed therein. The FPCB harness 20 may thus be deformable. In the example shown in FIGS. 2 to 5, the FPCB harness 20 extends along a length in the x-direction, a width in the y-direction, and a thickness (or depth or height) in the z-direction. The x direction may be defined as the axial direction of the FPCB harness. Thus, the x-direction (and thus the z-direction) may change along the length of the FPCB harness 20 as the FPCB harness is deformed. This is illustrated in FIG. 3. The x-y surface(s) may be said to be the major surface(s) of the FPCB harness. In the example shown in FIGS. 2 to 5, the FPCB harness is deformable in the z direction, i.e. in a direction perpendicular to the major surface. FPCB harnesses may be additionally of alternatively deformable about any other direction, and/or may be twisted about any one or more of the x, y, or z directions.

The flexible substrate 40 may be a dielectric. By way of example, the substrate material may be, by way of example only, polyamide. As will be readily apparent, other suitable substrate material could alternatively be used.

The conductive tracks 30, which may be surrounded by the substrate, may be formed using any suitable conductive material, such as, by way of example only, copper, although other materials could alternatively be used. The conductive tracks 30 may be used to conduct/transfer electrical signals and/or electrical power, for example around a gas turbine engine and/or to/from components of a gas turbine engine and/or an airframe attached to a gas turbine engine. The size (for example the cross-sectional area) and/or the shape of the conductive tracks 30 may depend on the signal to be transmitted through the particular conductive track 30. Thus, the shape and/or size of the individual conductive tracks 30 may or may not be uniform in a FPCB harness 20.

The example shown in FIGS. 2 to 5 has 6 conductive tracks 30 running through the substrate 40. However, the number of conductive tracks 30 running through a substrate 40 could be fewer than 6, or greater than 6. Indeed the number of conductive tracks 30 could be far greater than 6, for example tens or hundreds of tracks, as required. As such, many electrical signals and/or power transmission lines may be incorporated into a single FPCB harness.

A single FPCB harness 20 may comprise one layer of tracks, or more than one layer of tracks, for example, 2, 3, 4, 5, 6, 7, 8, 9, 10 or more than 10 layers of tracks. An FPCB harness may comprise significantly more than 10 layers of tracks, for example at least an order of magnitude more layers of tracks. In this regard, a layer of tracks may be defined as being a series of tracks that extend in the same x-y surface. Thus, the example shown in FIGS. 2 to 5 comprises 2 layers of tracks 30, with each layer comprising 3 tracks.

Using an FPCB harness to transmit electrical signals and/or power is therefore advantageous over a conventional harness, for example because of its reduced size, weight and/or complexity.

In order to attach a harness to a component (for example to a gas turbine engine or related airframe), a clip is required. An example of a clip that may be used to attach a conventional harness to a gas turbine engine is shown in FIG. 7. The clip 50 shown in FIG. 7 is configured to hold a cable, or a bundle of cables which form at east a part of a conventional wire cable harness. The clip 50 has a generally cylindrical outer casing 52 with a diameter 58 and a structural internal element 54 configured to provide strength to the clip 50. The clip 50 shown in FIG. 7 also has teeth 56 configured to grasp the generally cylindrical conventional cable harness, although the teeth 56 may not be present in some conventional clips.

FIGS. 8 and 9 show an alternative clip 60 for holding a conventional cable harness. The clip 60 shown in FIGS. 8 and 9 comprises two arms 64, 66 that define a space 62 therebetween for holding a conventional cable harness or bundle of cable harnesses. The space 62 defined between the two arms 64, 66 may be generally cylindrical. The two arms 64, 66 are sprung so as to be able to accommodate various diameters of conventional cable harnesses.

OBJECTS AND SUMMARY OF THE INVENTION

FPCB harnesses have properties that present difficulties when considering how to attach them to components, for example of a gas turbine engine. For example, the FPCB harnesses may have mechanical properties that mean that known clips, such as those described above, are not suitable for attaching them to components. Purely by way of example only, the flexible substrate material may be relatively easily damaged (for example punctured or sliced) by conventional clips.

As explained herein, FPCB harnesses offer considerable advantages over conventional harness in terms of, amongst other things, size and weight. It is desirable to maximize this size/weight benefit by providing an attachment device for allowing the FPCB harnesses to be connected to components in a compact, efficient manner. Conventional clips are therefore not desirable, or even suitable.

According to the an aspect of the invention, there is provided a gas turbine engine installation comprising: a flexible printed circuit board harness arranged to transfer electrical signals around the engine installation: and at least one clip holding the printed circuit board harness, each clip comprising a generally U-shaped channel defined by a base with first and second sidewalls extending therefrom. The flexible printed circuit board harness is a thin, elongate member having upper and lower parallel major surfaces defined by a length and a width, and a thickness normal to the major surfaces. The first sidewall has a first side-tooth extending therefrom. The second sidewall has a second side-tooth extending therefrom. The base has a first set of base-teeth and a second set of base-teeth arranged such that a first portion of the flexible printed circuit board harness is gripped between tips of the first set of base-teeth and the first side-tooth, and a second portion of the flexible printed circuit board harness is gripped between tips of the second set of base-teeth and the second side-tooth.

Such an arrangement provides a particularly secure way of holding a FPCB harness and/or securing/attaching a FPCB harness to, for example, a gas turbine engine. The FPCB harness may be received by the generally U-shaped channel, and secured in position (or gripped) by the side-teeth and the base-teeth.

The electrical signals can be of any type that may be transmitted along electrical conductors, for example electrical power transmission, and/or signals (for example control signals) to, from or between components (for example electrical components) of the gas turbine engine installation. The FPCB harnesses for transmitting the electrical signals may be as described herein, for example with reference to FIGS. 2 to 5.

The first and second set of base-teeth may, in some cases, have no gap between them such that they form a continuous set of teeth extending from the base.

The flexible printed circuit board harness may be gripped at the first portion between the first set of base-teeth on its lower major surface and the first side-tooth on its upper major surface. The flexible printed circuit board harness may be gripped at the second portion between the second set of base-teeth on its lower major surface and the second side-tooth on its upper major surface. The first portion may extend over at least a part of one half of the width of the FPCB harness, and the second portion may extend over at least a part of the other half of the width of the FPCB harness.

Both the first set of base-teeth and the second set of base-teeth may comprise at least two teeth. For example, both the first set of base teeth and the second set of base-teeth may comprise two teeth, three teeth, four teeth, five teeth, or more than five teeth, for example at least ten teeth. This may allow the FPCB harness to be particularly securely gripped by the clip. However, some embodiments may only have a single tooth in both the first set of base-teeth and the second set of base-teeth.

The base of the clip may extend in a direction that is generally parallel to the upper and lower major surfaces of the flexible printed circuit board harness. As such, the FPCB harness may be conveniently accepted into the U-shaped channel, with the bottom of the U-shaped channel being formed by the base of the clip.

The teeth of the first and second set of base-teeth may extend (that is to say, from the base to the tip of each tooth) generally perpendicularly from the base. As such, the first and second set of base-teeth may point in a direction that is generally perpendicular to the loser major surface of the FPCB harness.

The first side-tooth and the second side-tooth may extend in a direction that is generally perpendicular to the direction of the teeth of the first and second set of base-teeth. As such, the first and second side-teeth may partially close, or restrict, the opening to the U-shaped channel. In other words, the first and second side-teeth may extend, from root to tip, in a direction that is substantially parallel to (or at least has a component parallel to) the plane of the base. As such the first and second side-teeth may act to reduce the possibility of (or substantially prevent) the FPCB falling out of the clip through the top, i.e. through the opening in the U-shape, through which it may be inserted into the clip.

The tips of the first and second side-teeth may be angled in a direction that has a component pointing towards the upper major surface of the flexible printed circuit board harness. This may allow the tips of the side-teeth to directly contact, and thus grip, the upper major surface of the FPCB harness. Additionally or alternatively, it may facilitate biasing of the side-teeth towards the FPCB harness.

The tips of the first and second set of base-teeth may not be directly opposed to the tips of the first and second side-teeth. As such, the tips of the base-teeth and side-teeth may be offset in a width direction of the FPCB harness being held by them.

There may be a gap between the tips of the side-teeth and the tips of the corresponding base-teeth prior to insertion of the flexible printed circuit board harness into the clip. The gap may be less than the thickness of the flexible printed circuit board harness. This gap may be said to be in the thickness direction of the FPCB harness. This may allow the base-teeth and side-teeth to grip the FPCB harness more effectively, for example due to the teeth being biased towards the FPCB harness during use.

The tips of the side-teeth and the tips of the corresponding base-teeth may be intermeshed prior to insertion of the flexible printed circuit board harness into the clip. As such, the tips of the side-teeth and the tips of the corresponding base-teeth may be said to overlap in the thickness direction of the FPCB harness. This may be convenient for gripping particularly thin FPCB harnesses.

The side-teeth and the base-teeth may be elongate elements. The side-teeth and the base-teeth may have a longitudinal axis extending parallel to the length direction of the flexible printed circuit board harness. Thus, the teeth may be arranged to contact and grip the FPCB harness along a length portion thereof, thereby securing the FPCB harness in position.

The base and the first and second sidewalls (including the base-teeth and the side-teeth) may be formed using a material comprising one or more of: ethylene-propylene rubber, a silicone based compound, and a nitrile material. These materials may provide good grip to a FPCB harness whilst being compliant so as to minimize the possibility of damage to the FPCB harness. The particular material may be chosen depending on the application, for example the environment (for example in terms of temperature variation) in which the clip is to be used and/or the type of FPCB harness it is to be used with.

The clip may comprise a support structure configured to resist changes in shape of the clip under operational loads. The support structure may be relatively more stiff than the base and the first and second sidewalls. As such, the support structure may help to reduce, or substantially prevent, flexing of the clip, for example flexing of the external shape of the clip. This may help to ensure that the base and first and second sidewalls retain the desired shape under load. For example, it may help to ensure that the base-teeth and the side-teeth are not forced apart when a load is applied to the clip, for example when a load is applied to a sidewall of the clip. This may help to ensure that the FPCB harness is clamped with the desired force.

The clip may comprise a main body that incorporates the base and the first and second sidewalls. Thus, the main body may also include the base-teeth and the side-teeth. The support structure may extend around at least a part of the main body. This may be a convenient arrangement for providing structural support to the clip.

The support structure may be formed using a material comprising metal and/or a composite/fibre resin. The support structure may thus be constructed using a material that is more stiff than the main body and/or the jaw of the clip. This may allow the clip to be structurally stiff, whilst retaining compliant teeth for gripping the FPCB harness.

The support structure may further comprise an attachment portion used to attach the clip to the gas turbine engine, or a component thereof. Thus, the clip can be particularly compact, with a minimal number of parts required to attach it (and thus a FPCB harness) to a component. This may have further weight and/or size benefits.

BRIEF DESCRIPTION OF THE DRAWINGS

The invention will now be described, by way of example only, with reference to the accompanying Figures, in which.

DETAILED DESCRIPTION OF THE PREFERRED EMBODIMENTS

Figure 1:
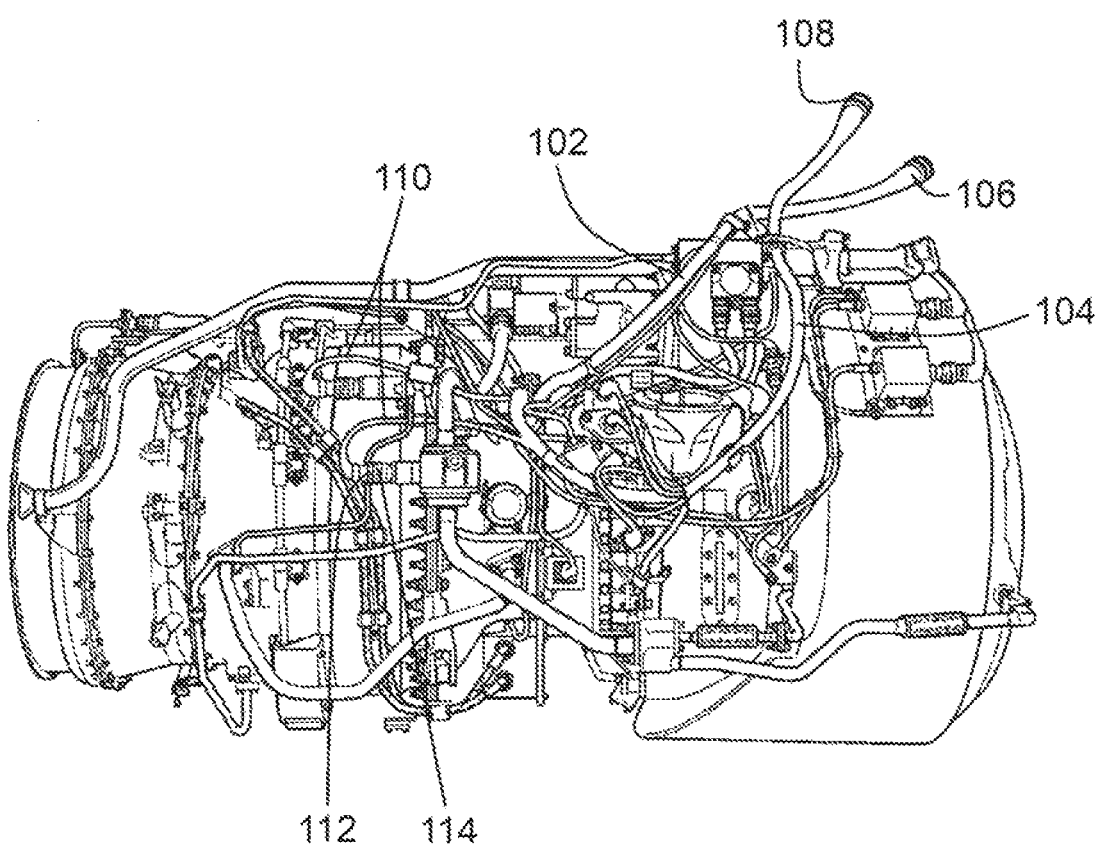
FIG. 1 shows a gas turbine engine with a conventional harness.
Figure 2:
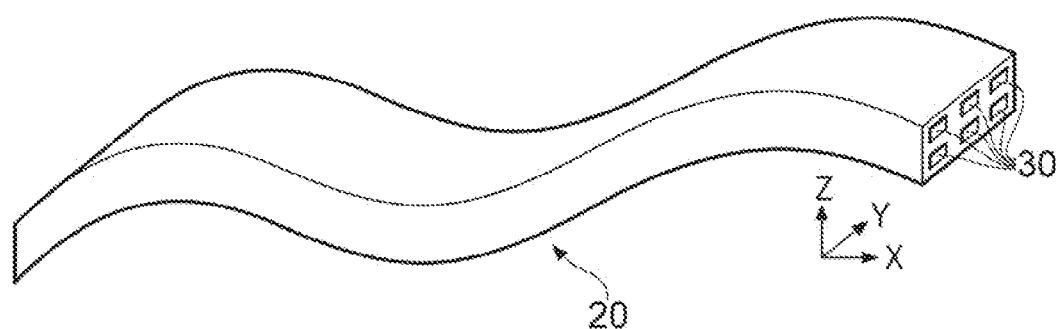
FIG. 2 shows perspective view of a portion of a flexible printed circuit board harness.
Figure 3:
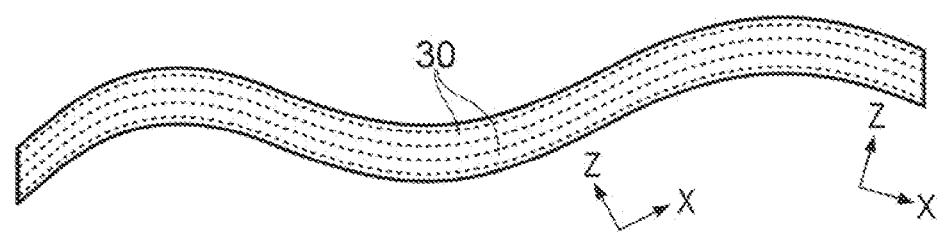
FIG. 3 shows a side view of the flexible printed circuit board harness of FIG. 2.
Figure 4:
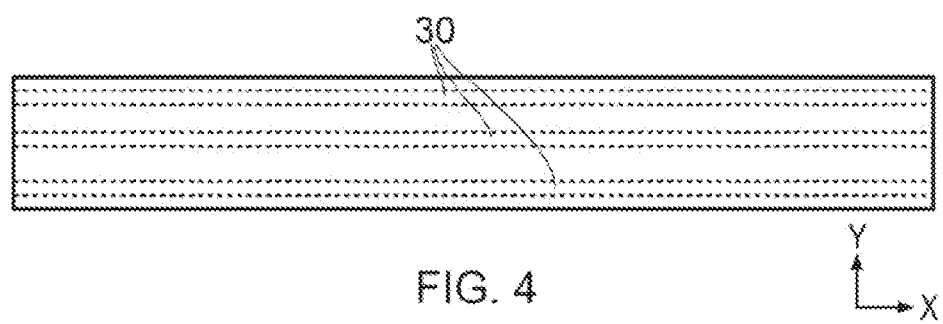
FIG. 4 shows a top view of the flexible printed circuit board harness of FIG. 2.
Figure 5:
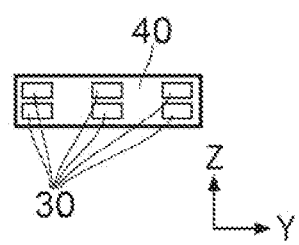
FIG. 5 shows a cross-sectional view of the flexible printed circuit board harness of FIG. 2.
Figure 6:
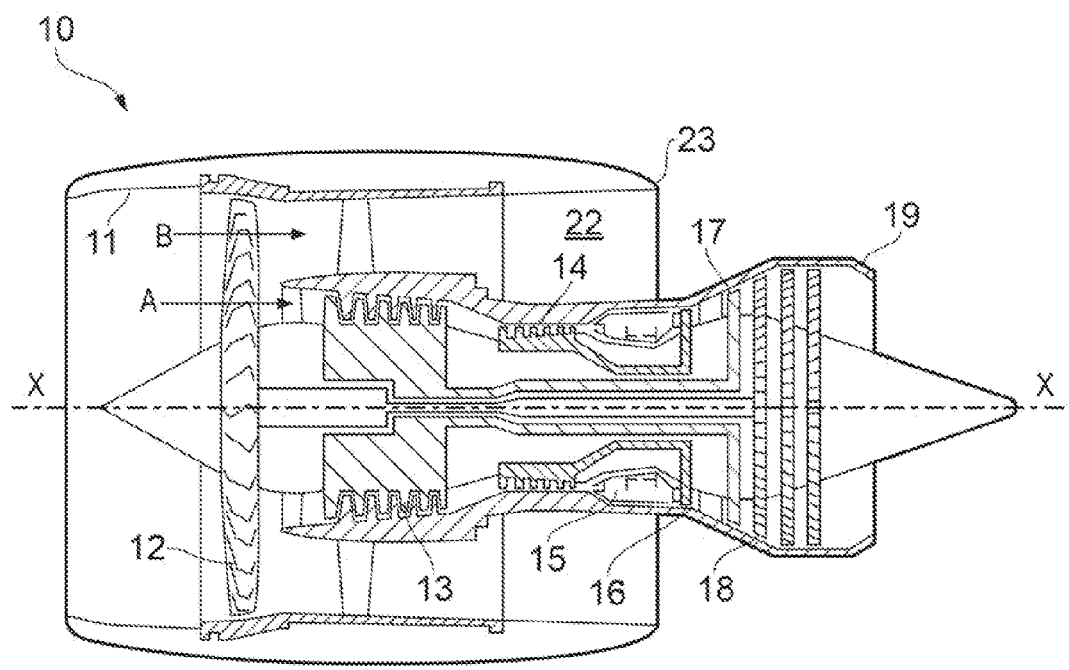
FIG. 6 is a cross-section through a gas turbine engine.
Figure 7:
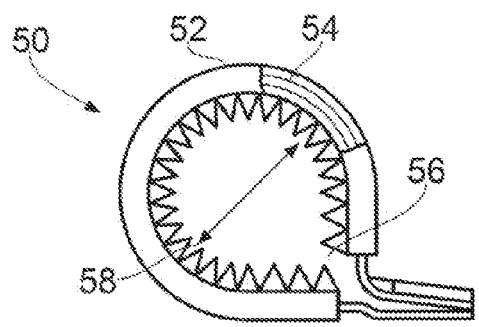
FIG. 7 shows a side view of a clip for holding a conventional harness in place.
Figure 8:
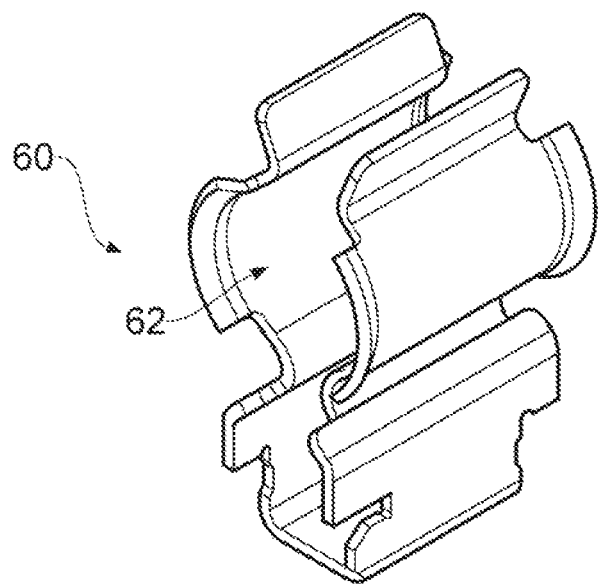
FIG. 8 shows a perspective view of an alternative clip for holding a conventional harness in place.
Figure 9:
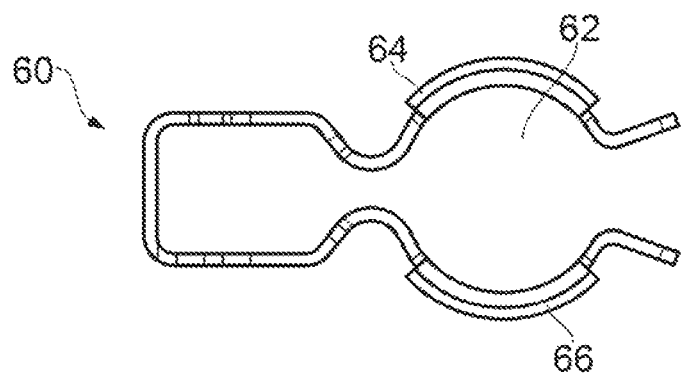
FIG. 9 shows a side view of the clip shown in FIG. 8.

With reference to FIG. 6, a ducted fan gas turbine engine generally indicated at 19 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The gas turbine engine 10 shown in FIG. 6 may be at least a part of a gas turbine engine installation according to the present invention. The gas turbine engine 10 may comprise one or more FPCB harnesses (such as those described above in relation to FIGS. 2 to 5) for transmitting/transferring electrical signals around the engine and/or to/from the engine 10 from other components, such as components of an airframe. The function and/or construction of the FPCB harnesses may be as described above and elsewhere herein.

Figure 10:
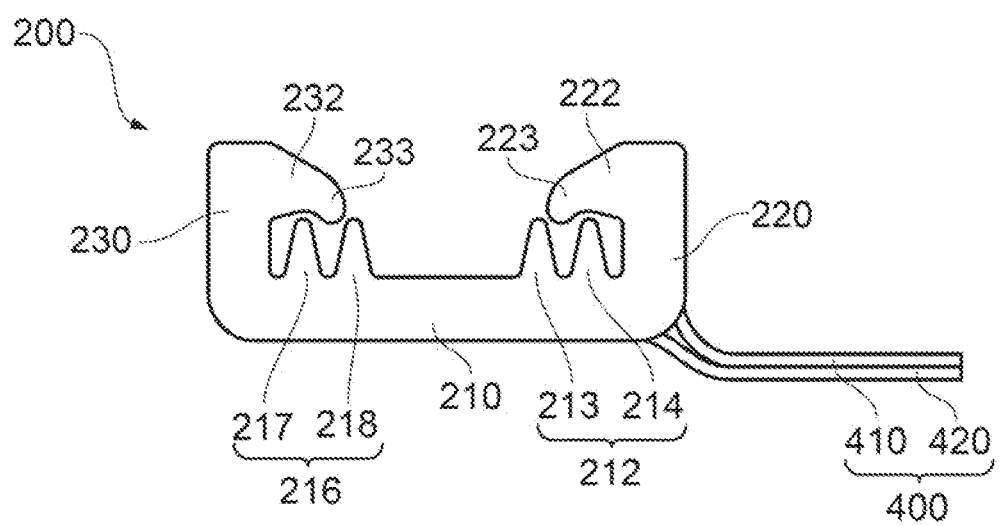
FIG. 10 shows a front view of clip in accordance with the present invention.
Figure 11:
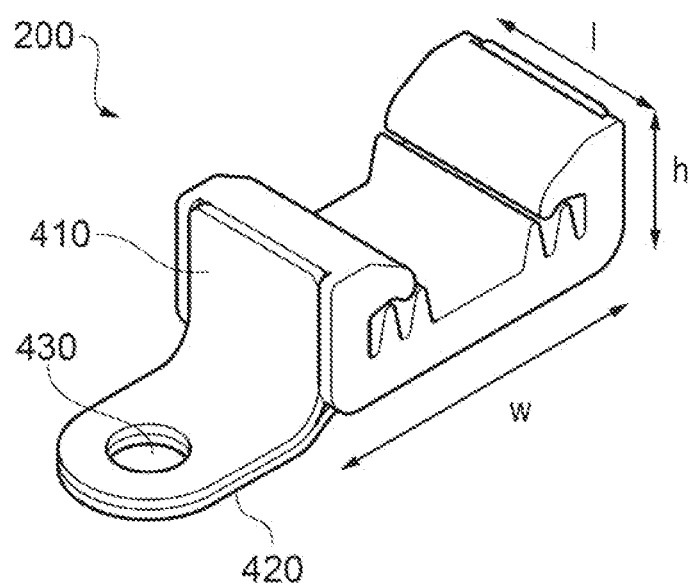
FIG. 11 shows a perspective view of a clip according to FIG. 10.
Figure 12:
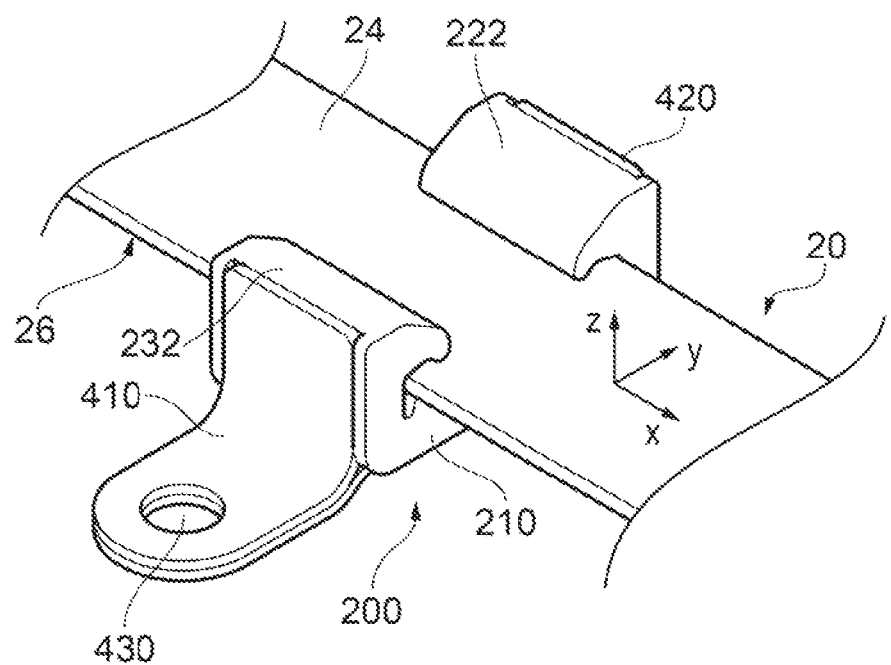
FIG. 12 shows the clip according to FIGS. 10 and 11 holding a FPCB harness.

The FPCB harnesses may be attached to any part of the engine installation (of which the engine 10 may be a part) using a clip such as the clip 200 shown in FIGS. 10 and 11. Any one or more than one of the clips 200 could be used to hold one or more than one FPCB harness and thereby attach one or more FPCB harnesses to the engine. Other types of clip could be used in conjunction with that clip 200 shown in FIGS. 10 and 11. FIG. 12 shows the clip 200 of FIGS. 10 and 11 being used to hold a FPCB harness 20. In FIGS. 10 and 11, the clip 200 is shown without any FPCB harness inserted, and thus in an undeformed state without any force applied to it.

The clip 200 has a base 210, from which a first sidewall 220 and a second sidewall 230 extend. The base 210, first sidewall 220, and second sidewall 230 form a substantially U-shaped channel.

The base 210 comprises a first set of base-teeth 212 and a second set of base-teeth 216. The first set of base-teeth 212 comprises two teeth 213, 214, and the second set of base-teeth 216 comprises two teeth 217, 218. In other embodiments, the first and second set of base-teeth 212, 216 may comprise other numbers of teeth.

The first sidewall 220 comprises a first side-tooth 222. The second sidewall 230 comprises a second side-tooth 232. The first and second side-teeth 222, 232 may partially block-off, or partially close, the entrance to the U-shaped channel, as clearly seen in FIGS. 10 and 11. The tips 223, 233 of the side-teeth 222, 232 are directed, or bent, towards the base 210, i.e. towards the tips of the base-teeth 213, 214, 217, 218. Thus, the tips 223, 233 of the side-teeth 222, 232 are directed, or bent, towards the FPCB harness 20 so as to grip the FPCB harness 20 when installed, as shown in FIG. 12. As such, the side-teeth 222, 232 may be said to have a hook, or bent, shape in cross-section. Other embodiments may have other shapes of side-teeth.

In the arrangement of FIGS. 10 and 11, the tip 223 of the first side-tooth 222 is between the teeth 213, 214 of the first set of base-teeth 212. Similarly, the tip 233 of the second side-tooth 232 is between the teeth 217, 218 of the second set of base-teeth 216. As such, in the undeformed state of FIGS. 10 and 11, the first and second side-teeth 222, 232 intermesh with the corresponding first and second set of base-teeth 212, 216. In other embodiments, there may be a gap provided between the tips of the base-teeth 213, 214, 217, 218 and the tips 223, 223 of the side-teeth when the dip is in the undeformed state (i.e. when no FPCB harness is inserted into the clip).

During assembly, one side the FPCB harness 20 may be inserted into one side of the clip 200, for example the left hand side as shown in FIG. 10. The other side of the FPCB harness 20 may then be pushed downwards into the other side for example right hand side shown in FIG. 10) of the clip 200, such that it displaces the side-tooth 222 and also displaces (for example compresses) the base-teeth 213, 214. When the FPCB harness has been moved far enough down into the clip, by sufficient displacement of the base-teeth 213, 214, the side-tooth 222 may then spring back into position.

As shown in FIG. 12, after insertion of the FPCB harness 20 into the clip 200 (which may be by the above method or any other method), the first and second sets of base-teeth 212, 216 grip the lower major surface 26 of the FPCB harness 20, and the side teeth 222, 232 grip the upper major surface 24 of the FPCB harness 20. In this regard, the upper and lower major surfaces 24, 26 extend in the length direction x and the width direction y of the FPCB harness 20. The FPCB harness 20 is thus gripped on one side (i.e. over at least a part of one half of its width) between the first side-tooth 222 and the first set of base-teeth 212, and on the other side (i.e. over at least a part of the other half of its width) between the second side-tooth 232 and second set of base-teeth 216.

The base-teeth 213, 214, 217, 218 and the side-teeth 222, 232 in the clip 200 shown in FIGS. 10 to 12 are elongate elements with a longitudinal axis extending in the length direction x of the FPCB harness 20 when installed. In the clip 200 of FIGS. 10 to 12, the base-teeth 213, 214, 217, 218 and the side-teeth 222, 232 have a constant cross-sectional shape that extends along their longitudinal axis. The tips of the base-teeth 213, 214, 217, 218 and the side-teeth 222, 232 grip the lower major surface 26 and the upper major surface 24 respectively along a portion (for example a thin portion, such as a line) extending in the length direction x of the FPCB harness 20.

The clip 200 shown in FIGS. 10 to 12 has a support structure 400. The support structure provides support to the base 210 and first and second sidewalls 220, 230 of the clip 200 so as to restrict or minimize flexing/bending of the clip 200. The support structure 400 may thus be stiffer, for example constructed from a stiffer material, than the main body of the clip 200. The support structure 400 shown in the Figures is attached (for example bonded) to external surfaces of the base 210 and first and second sidewalls 220, 230 of the clip 200. However, other arrangements of support structure 400 may be used. For example, the support structure may penetrate into the material of the base 210 and/or first and second sidewalls 220, 230 of the clip 200. The support structure 400 shown in the Figures comprises two parts 410, 420, that may be attached together (for example by welding) to produce the final support structure 400. Again, other constructions could be used in clips for alternative embodiments.

The support structure 400 shown in the figures has an attachment portion 430 (which in the illustrated example comprises a hole for receiving a fixing element, such as a screw, bolt, or rivet) that is configured to allow the clip 200 to be attached to a component, for example of the gas turbine installation. As mentioned above, this may be a particularly convenient, lightweight and compact arrangement for connecting the clips 200, and thus the FPCB harnesses 20, to components. However, some clips for use in embodiments of the invention may not have a support structure 400 at all, or may have a support structure 400 without an attachment portion 430.

Any suitable material may be used to manufacture the base 210 and first and second sidewalls 220, 230 of the clip 200, which may include the base-teeth sets 212, 216 and the side-teeth 222, 232. For example, the material may comprise one or more of ethylene-propylene rubber, a silicone based compound, and a nitrite material. In clips which have a support structure 400, the support structure 400 may be constructed from a stiffer material than the base 210 and first and second sidewalls 220, 230, for example from a metal and/or a resin/fibre composite.

The clip 200 could be any suitable size required to hold a FPCB harness 20. Purely by way of non-limitative example, and with reference to FIG. 11, the length of the clip 200 may be in the range of from 5 mm to 200 mm, for example 10 mm to 150 mm, for example 25 mm to 100 mm, for example on the order of 50 mm. The width 'w' of the clip 200 may be in the range of from 5 mm to 500 mm, for example 10 mm to 200 mm, for example 25 mm to 100 mm, for example on the order of 50 mm. The height 'h' of the clip 200 may be in the range of from 0.5 mm to 50 mm for example 2 mm to 10 mm, for example 3 mm to 8 mm, for example on the order of 5 mm. In other embodiments, the dimensions 'l', 'h', and 'w' may be outside these ranges.

Where reference is made herein to a gas turbine engine installation, it will be appreciated that this term may include a gas turbine engine and/or any peripheral components to which the gas turbine engine may be connected to or interact with and/or any connections/interfaces with surrounding components, which may include, for example, an airframe and/or components thereof. Such connections with an airframe, which are encompassed by the term 'gas turbine engine installation' as used herein include, but are not limited to, pylons and mountings and their respective connections. The gas turbine engine itself may be any type of gas turbine engine, including, but not limited to, a turbofan (bypass) gas turbine engine, turbojet, turboprop, ramjet, scramjet or open rotor gas turbine engine, industrial It will be appreciated that many alternative configurations and/or arrangements of the clip 200 other than those described herein may fall within the scope of the invention. For example, alternative arrangements of the first and second sets of base-teeth 212, 216, side-teeth 232, 233 support structure 400, and/or FPCB harness 20 may fall within the scope of the invention and may be readily apparent to the skilled person from the disclosure provided herein. Furthermore, any feature described and/or claimed herein may be combined with any other compatible feature described in relation to the same or another embodiment.

We claim:

1. A gas turbine engine installation comprising:
    a flexible printed circuit board harness arranged to transfer electrical signals around the gas turbine engine installation,
    the flexible printed circuit board harness being a thin, elongate member having upper and lower parallel major surfaces defined by a length (x) and a width (y), the flexible printed circuit harness further having a thickness (z) normal to the parallel major surfaces, the width (y) being longer than the thickness (z); and
    at least one clip holding the flexible printed circuit board harness, each clip comprising a generally U-shaped member defined by a base having a first end and a second end, the base spanning the width (y) between the first end and the second end, each clip further comprising a first sidewall extending from the first end and a second sidewall extending from the second end, and an opening opposite the base and between the first and second sidewalls for the insertion of the flexible printed circuit board harness wherein:
    the first sidewall has a first side-tooth extending therefrom, and the second sidewall has a second side-tooth extending therefrom;
    the base has a first set of base-teeth and a second set of base-teeth arranged such that a first portion of the flexible printed circuit board harness is gripped between tips of the first set of base-teeth and a tip of the first side-tooth, and a second portion of the flexible printed circuit board harness is gripped between tips of the second set of base-teeth and a tip of the second side-tooth; and
    the width (y) of the flexible printed circuit board harness is contained entirely between the first and second sidewalls.

2. The gas turbine engine installation according to claim 1, wherein:
    the flexible printed circuit board harness is gripped at the first portion between the first set of base-teeth on the lower parallel major surface and the first side-tooth on upper parallel major surface, and at the second portion between the second set of base-teeth on the lower parallel major surface and the second side-tooth on the upper parallel major surface.

3. The gas turbine engine installation according to claim 1, wherein the base of each clip extends in a direction that is generally parallel to the upper and lower parallel major surfaces.

4. The gas turbine engine installation according to claim 1, wherein teeth of the first and second set of base-teeth extend generally perpendicularly from the base.

5. The gas turbine engine installation according to claim 1, wherein the first side-tooth and the second side-tooth extend in a direction that is generally perpendicular to a direction of teeth of the first and second set of base-teeth.

6. The gas turbine engine installation according to claim 1, wherein the tips of the first and second side-teeth are angled in a direction that has a component pointing towards the upper parallel major surface of the flexible printed circuit board harness.

7. The gas turbine engine installation according to claim 1, wherein the tips of the first and second set of base-teeth are not directly opposed to the tips of the first and second side-teeth.

8. The gas turbine engine installation according to claim 1, wherein there is a gap between the tips of the side-teeth and the tips of the corresponding base-teeth prior to insertion of the flexible printed circuit board harness into each clip, the gap being less than the thickness of the flexible printed circuit board harness.

9. The gas turbine engine installation according to claim 1, wherein the tips of the side-teeth and the tips of the corresponding base-teeth are intermeshed prior to insertion of the flexible printed circuit board harness into each clip.

10. The gas turbine engine installation according to claim 1, wherein the side-teeth and the base-teeth are elongate elements having a longitudinal axis extending parallel to the length of the flexible printed circuit board harness.

11. The gas turbine engine installation according to claim 1, wherein the base and the first and second sidewalls are formed using a material comprising one or more of: ethylene-propylene rubber, a silicone based compound, and a nitrile material.

12. The gas turbine engine installation according to claim 1, wherein each clip further comprises a support structure configured to resist changes in shape of each clip under operational loads, the support structure being relatively stiffer than the base and the first and second sidewalls.

13. The gas turbine engine installation according to claim 12, wherein:
    each clip comprises a main body that incorporates the base and the first and second sidewalls; and
    the support structure extends around at least a part of the main body.

14. The gas turbine engine installation according to claim 12, wherein the support structure further comprises an attachment portion used to attach each clip to the gas turbine engine installation, or a component thereof.

* * * * *